United States Patent [19]

Lizogub et al.

[11] 4,290,610

[45] Sep. 22, 1981

[54] LABYRINTH SEAL

[76] Inventors: Vadim A. Lizogub, Orekhovy bulvar, 11, korpus 1, kv. 101; Alexandr P. Kushnir, Paveletskaya, naberezhnaya, 10 korpus 2, kv. 40; Alexandr M. Figatner, proezd Rusanova, 31, korpus 2, kv. 47; Stepan E. Bondar, ulitsa Vvedenskogo, 22, korpus 2, kv. 297, all of Moscow, U.S.S.R.

[21] Appl. No.: 125,454

[22] Filed: Feb. 28, 1980

[30] Foreign Application Priority Data

Jan. 4, 1978 [SU] U.S.S.R. ................ 2565435

[51] Int. Cl.³ ............................................. F16J 15/44
[52] U.S. Cl. ....................................... 277/13; 277/24; 277/25; 277/56; 277/79
[58] Field of Search ............ 277/13, 14 R, 14 V, 277/24, 25, 7, 53–57, 71, 72 R, 74, 75, 79

[56] References Cited

U.S. PATENT DOCUMENTS

| 822,802 | 6/1906 | Wilkinson | 277/14 |
| 1,187,212 | 6/1916 | Westinghouse | 277/56 X |
| 2,891,808 | 6/1959 | Richardson | 277/53 |
| 3,357,708 | 12/1967 | Parr | 277/56 |

FOREIGN PATENT DOCUMENTS 369463 2/1923 Fed. Rep. of Germany ........ 277/56

*Primary Examiner*—Robert S. Ward, Jr.
*Attorney, Agent, or Firm*—Robert E. Burns; Emmanuel J. Lobato; Bruce L. Adams

[57] ABSTRACT

A labyrinth seal of a shaft comprises ring plates arranged in an alternating fashion in parallel with one another and coaxially with the shaft. One set of plates are rigidly fixed to the shaft and the other set of plates are fixed to a stationary sleeve. According to the invention, the sleeve has at least one through passage arranged in a plane intersecting the axis of the shaft and extending at angle ranging from about −60° to about +60° to a radial plane running at right angle to the axis of the shaft. The passage terminates at one end in the space between adjacent plates to remove the fluid under action of centrifugal force during rotation of the shaft.

3 Claims, 4 Drawing Figures

LABYRINTH SEAL

BACKGROUND OF THE INVENTION

The present invention relates to the mechanical engineering, and more particularly, to a labyrinth seal.

The labyrinth seal according to the present invention may be most efficiently used for protecting spindle assembly supports of metal cutting machine tools against penetration of dust and moisture both during shaft rotation and after its stoppage.

The present invention may also be used for sealing rotary shafts and bearing assemblies in the automotive industry, instrumentation engineering, aviation industry and in other fields.

Known in the art is a labyrinth seal of a shaft, comprising a non-rotating axially movable sleeve and a sleeve rigidly fixed to the shaft coaxially therewith. The non-rotating sleeve is made split (of two halves) in the diametrical plane (the plane extending through the shaft axis) and has annular projections on the inner surface of the sleeve.

The outer periphery of the non-rotating sleeve is a cylindrical surface aligning the sleeve in a casing of an assembly being sealed, coaxially with the shaft. The annular projections are rounded at the inner diameter and at points where they mate with the sleeve.

The sleeve fixed to the shaft is an integral part and has annular projections similar to the above-described projections and provided on the outer periphery of the sleeve.

The annular projections are arranged in an alternating fashion in parallel to one another and coaxially with the shaft (cf. U.S. Pat. No. 3,357,708, Cl. 227-56, 1967).

The prior art labyrinth seal is not sufficiently tight at relatively high speed of the shaft, as well as at the moments when the shaft is started or stopped owing to the fact that at high rotary speed of the shaft fluid particles penetrating the space between the annular projections acquire higher energy due to a turbulent stirring of air and fluid particles.

Thus fluid particles fill up the space in the seal between the annular projections and may then enter the assembly bearing sealed. When the shaft is stopped fluid particles penetrating the space between the projections remain in the seal and upon starting they may also penetrate the assembly being sealed. In addition, the seal is not sufficiently tight owing to large spaces between the projections, which cannot be diminished in view of manufacturing difficulties.

Known in the art is also a labyrinth seal of a shaft, comprising ring plates separated by means of spacer rings and arranged in an alternating fashion in parallel with one another and coaxially with the shaft.

One set of ring plates are rigidly fixed to the shaft and the other set of the ring plates are fixed to a casing. One of the end plates secured to the shaft is made of a flexible material (such as rubber) and engages a conical bore of the casing (cf. British patent specification No. 918,999, Cl. F 06 J, 1960).

The prior art labyrinth seal is characterized by high heat release (especially at high rotary speed of the shaft) due to mechanical friction between the flexible plate and conical bore of the casing.

In addition, owing to the rigid installation of the plates in the casing and on the shaft, the seal does not permit to the shaft to move in the axial direction.

Known in the art is a labyrinth seal of a shaft, comprising one outer sleeve and one rotary inner sleeve coaxial therewith, the sleeve being of a circumferential ogee profile facing one another and defining an inner space.

The outer sleeve has in the intermediate portion at least one transverse radial slot which also extends through the inner sleeve. The outer sleeve has a cylindrical outer periphery for a rigid fitting in the casing of a sealed assembly coaxially with the shaft.

The inner sleeve is rigidly fixed on the shaft along the inner cylindrical surface (cf. DT Pat. No. 1650083, Cl. F 16 J 15/44, 1967).

The known labyrinth seal is not sufficiently tight at high rotary speed of the shaft and at stationary shaft owing to the fact that radial slots are provided in the inner rotary sleeve to increase the swirling of fluid particles penetrating the seal and to create pulsating pressure in the interior of the seal in cooperation with the slots of the outer sleeve.

Increased swirling of fluid particles and pulsating pressure at high rotary speed of the shaft result in a material increase in the hydraulic drag of a drain slot, its overfilling with fluid and loss of tightness of the seal.

The circumferential ogee profile of the sleeves features rather low tightness upon stoppage of the shaft. Moreover, the radial slots of the sleeves reduce the working length of the labyrinth and increase local clearances in the seal. This results in low tightness of the seal upon stoppage of the shaft.

In view of more intense swirling of fluid, the seal is characterized by comparatively high heat release.

The provision of slots in the rotary sleeve is also undesirable for high-speed seals in view of possible unbalance.

The disadvantage of the prior art labyrinth seal also resides in complicated manufacture which requires special jigs and equipment.

The outer sleeve is made of a soft alloy (such as aluminium) for the manufacturing reasons.

Thus, in operation in an abrasive medium, the outer sleeve is intensely worn, and the wear products from the seal may penetrate the assembly being sealed.

Since the sleeves are rigidly fixed to the shaft and casing, the seal makes it impossible for the shaft to move axially which may cause, e.g. jamming of bearings upon a temperature expansion of the shaft.

Known in the art is a labyrinth seal of a shaft, comprising ring plates separated by spacer rings and arranged in an alternating fashion in parallel to one another and coaxially with the shaft.

One set of the ring plates are rigidly fixed to the shaft together with a rotary sleeve, and the other set of the ring plates are secured to a non-rotating sleeve.

The non-rotating sleeve is installed in a casing of a spindle assembly coaxially with the shaft. Between the outer cylindrical periphery of the sleeve and the inner surface of the casing there is provided an elastic member enabling, owing to its deformation, an axial displacement of the non-rotating sleeve relative to the stationary casing.

When the shaft rotation is being stopped, the non-rotating sleeve, together with the ring plates and rings secured thereto, is displaced in the axial direction until the rotary and stationary ring plates engage one another. The labyrinth space between the plates is thus closed to provide the seal tightness upon stoppage of the shaft.

When the shaft starts rotating, a hydroaerodynamic lift force appears at the end faces of the plate cooperating with the fluid to shift the non-rotating sleeve axially until identical laybrinth spaces are defined between adjacent rotary and stationary plates. (cf. USSR Inventor's Certificate No. 572622, Int. Cl. F 16 J 15/44) Nov. 14, 1975, publ. Sept. 15, 1977, Off. Bull. No. 34, Moscow).

The prior art labyrinth seal is insufficiently tight at high rotary speed of the shaft, as well as at the moments of starting and stopping the shaft owing to the fact that at high rotary speeds, e.g. during a high-speed grinding, the degree of swirling of fluid flow increases, the fluid comprising a cutting fluid containing abrasive particles. The fluid particles overcome the hydraulic drag of the seal and penetrate the assembly bearing sealed. When the rotation is stopped, a portion of the fluid remains in the seal and may penetrate the assembly being sealed during the shaft starting.

SUMMARY OF THE INVENTION

It is the main object of the invention to provide a labyrinth seal having a construction ensuring improved tightness of the seal at high rotary speed of the shaft.

Another, not least important object of the invention is to provide a labyrinth seal which is so constructed as to improve tightness of the seal during the shaft starting and stoppage.

Further object of the invention is to provide a labyrinth seal which is so constructed as to ensure relatively low heat release between rotary and stationary plates and their minimum wear.

These objects are accomplished in a labyrinth seal of a shaft, comprising ring plates arranged in an alternating fashion in parallel with one another and coaxially with the shaft, one set of the plates being rigidly fixed to the shaft and the other set of the plates being fixed to a stationary sleeve, wherein, according to the invention, the stationary sleeve has at least one through passage extending in a plane intersecting the axis of the shaft and drawn at an angle ranging from about $-60°$ to about $+60°$ to a radial plane extending at right angle to the axis of the shaft, one end of the passage terminating in the space between the adjacent ring plates for removing fluid from this space under the action of centrifugal force during rotation of the shaft.

The seal tightness is improved owing to the fact that one or several passages are provided in the casing of an assembly being sealed, in the stationary sleeve and in the parts mating therewith, to communicate the space between adjacent ring plates with atmosphere.

The passage may be arranged either in a radial plane extending at right angle to the shaft axis, or, in case it is dictated by the structural considerations, at an angle to the radial plane drawn within the above-mentioned angle range.

In case the passages are arranged in planes extending at an angle exceeding 60°–70° to the radial plane, considerable energy losses occur to diminish the efficiency of operation of the passages. The seal functions most efficiently when the passages are arranged in the radial plane.

During rotation of the shaft fluid particles penetrating the space between the ring plates of the seal under the action of kinetic and potential energy, as well as under the action of inertia forces are removed into atmosphere through said through passages.

To avoid pressure reduction (compared to atmospheric pressure) in the assembly being sealed, and to ensure a reliable sealing upon reversing the rotation direction of the shaft, two passages are preferably provided in the seal, one passage being oriented in the rotation direction, and the other passage being directed oppositely.

In case the shaft is horizontal, the passage is preferably at an angle of 20° to 85° to the vertical in the rotation direction of the shaft.

Within this angle range the axis of the passage coincides with a tangent line to the path of movement of fluid particles penetrating the space between the plates.

In such case the value of the angle $\phi$ of inclination of the passage axis to the vertical is defined by the formula $$\phi = \text{arctg}(V_u/V_r,$$

wherein
$V_u$ is the circumferential component of fluid velocity;
$V_r$ is the radial component of fluid velocity.

It will be apparent from the above formula that at higher rotary speeds, hence at greater circumferential components of fluid velocity, the value of the angle $\phi$ increases, and vice versa, the smaller the ratio $V_u/V_r$, the smaller is the angle $\phi$. In practical applications, for grinding machines, an optimum value of the angle $\phi$ is substantially within the range from 70° to 85°, and for lathes it is about 20° and above. On the basis of structural considerations various portions of the passages may have different angles $\phi$ of inclination lengthwise.

At least one through hole with an axis extending at an acute angle to the rotation direction of the shaft is preferably made in the ring plate secured to the stationary sleeve at one end of the passage.

The use of the combination of passage and through hole in the seal enables a substantial enlargement of the field of efficient application of the labyrinth seal.

Since the angle $\phi$ of inclination of the passage is determined on the basis of initial parameters corresponding to the rated rotary speed of the shaft, the passages function with non-optimum performance at a shaft speed other than the rated speed. Thus, during the starting or stoppage the passages may be overfilled with the fluid, which may result in a loss of tightness of the seal.

The use of one or several through holes in the stationary ring plate enables an improvement of tightness of the seal during both starting and stoppage of the shaft as a major fraction of fluid is removed from the seal under the action of centrifugal forces into atmosphere through the through holes.

Since the through hole extends at an acute angle to the rotation direction of the shaft, the flow of fluid "running against" the hole changes its direction. Owing to a decrease in the tangential and radial components of velocities, the flow acquires an axial component of velocity and is removed from the seal into atmosphere. This is also facilitated by the fact that during rotation the end ring plate induces, in cooperation with the through hole, an ejection effect. In addition, a surplus quantity of fluid may be removed from the seal through the through hole, as well as through the passages under gravity.

To improve the efficiency of sealing, in certain application the through hole may be provided not only in the stationary ring plate but also in parts mating therewith.

The absence of direct contact between the rotary and stationary ring plates at the rated rotary speed minimizes heat release in the seal.

A combination of an appropriate choice of the angle φ of inclination of the passages and configuration of the through hole makes it possible to provide a seal exhibiting high tightness and capable of operating within any desired rotary speed range with comparatively low heat release and minimum wear rate even in heavily laden abrasive-filled emulsion medium.

BRIEF DESCRIPTION OF THE DRAWINGS

Specific embodiments of the invention will now be described in detail with reference to the accompanying drawings, in which.

DESCRIPTION OF THE PREFERRED EMBODIMENTS

Figure 1:
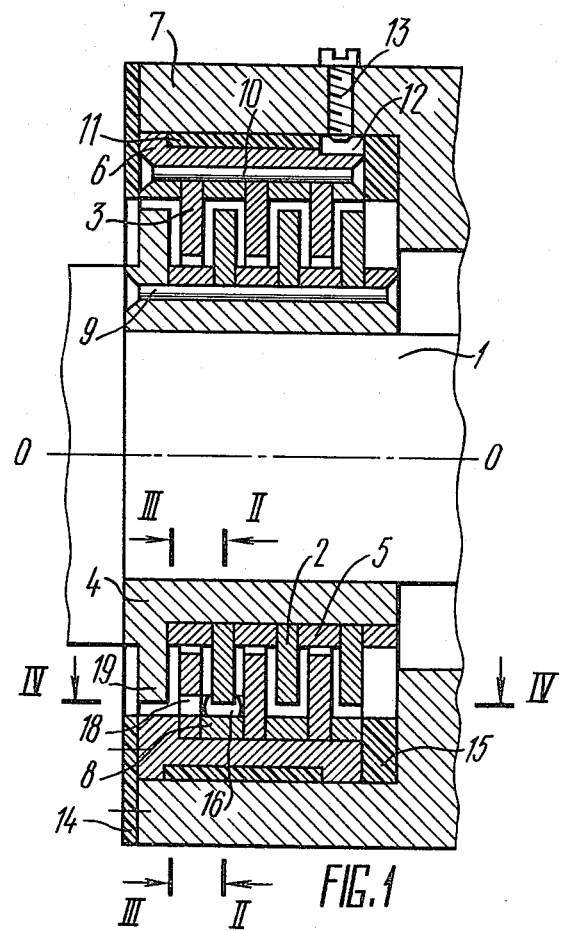
FIG. 1 schematically shows a labyrinth seal of a shaft according to the invention, in a longitudinal section.

A labyrinth seal according to the present invention is installed on a shaft 1 (FIG. 1) and comprises a set of ring plates 2 rigidly fixed to the shaft 1 and another set of ring plates 3. The plates 2 and 3 are arranged in an alternating fashion in parallel with one another and coaxially with the shaft 1.

A sleeve 4 is installed on the shaft 1 coaxially therewith, which is rigidly fixed to the shaft by any known means. The plates 2 alternate with rings 5 on the shaft 1, the rings also being coaxial with the shaft and designed for spacing the plate 2 apart from one another. The seal also has a stationary sleeve 6 which is installed coaxially with the shaft 1 and the inner surface of a casing 7 of an assembly being sealed (not shown) which may comprise, e.g. a bearing assembly of a machine tool. Between the outer cylindrical periphery of the sleeve 6 and the inner cylindrical surface 7 of the casing there is a space (not shown). The plates 3 and rings 8 coaxial with the shaft 1 alternate in the sleeve 6, the rings being designed for spacing the plates 3 apart from one another.

The plates 2 and the rings 5 are rigidly fixed to the sleeve 4 by means of rivets 9 having their geometrical longitudinal axes running in parallel with the axis 0—0 of the shaft 1 and coinciding with the outer cylindrical periphery of the sleeve 4.

Similarly, the plates 3 and the rings 8 are rigidly fixed to the sleeve 6 by means of rivets 10 having their geometrical longitudinal axes running in parallel with the axis 0—0 of the shaft 1 and arranged on the inner cylindrical surface of the sleeve 6.

In this embodiment there are four rivets 9 and four rivets 10 equally spaced along the circle.

The plates 2 and rings 5 may be secured to the sleeve 4 and the plates 3 and the rings 8 may be secured to the sleeve 6 by means of cementing, screwing, interference fitting, magnetical fastening and using other methods not to be described herein.

The outer cylindrical periphery of the sleeve 6 and the inner cylindrical surface of the casing 7 are sealed by means of an elastic ring 11 installed in a groove of the outer cylindrical periphery of the sleeve 6.

A recess 12 is provided in the outer cylindrical periphery of the sleeve 6. A screw 13 radially installed in the casing 7 and received in the recess 12 holds the sleeve 6 against rotation in the circumferential direction.

The end faces of the sleeve 6, that is the surfaces at right angle to the axis 0—0 of the shaft 1 are sealed by elastic rings 14 and 15.

The ring 14 protects the outer cylindrical periphery of the sleeve 6 and the inner cylindrical surface of the casing 7 against soiling with fluid particles. The ring 14 is secured at its outer side to the casing 7 and at its inner side to the sleeve 6 by any known means.

The ring 15 is designed for preliminary (setting) axial displacement of the sleeve 6 until the end faces of the plates 2 and 3 engage one another.

The rings 14 and 15 may be dispensed with in certain applications.

According to the invention, a through passage 16 (FIG. 2) is made in the stationary sleeve 6, which is arranged in a plane intersecting the axis 0—0 of the shaft 1 and extending at an angle within the range from about −60° to about +60° to a radial plane extending at right angle to the axis 0—0 of the shaft 1.

In this embodiment the angle is 0°, that is the plane coincides with the radial plane extending at right angle to the axis 0—0 of the shaft 1. The passage 16 terminates at one end in the space between the adjacent plates 2 and 3 and is designed for removing the fluid from this space under the action of centrifugal force during rotation of the shaft 1.

The through passage 16 also extends through the ring 8 and the elastic ring 11 of the casing 7.

Figure 2:
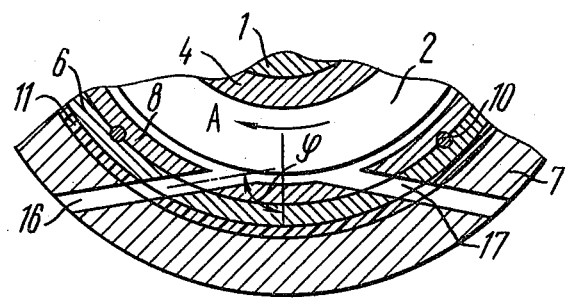
FIG. 2 is a partial section along the line II—II in FIG. 1.
Figure 3:
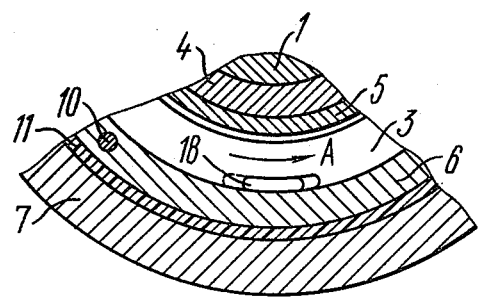
FIG. 3 is a partial section along the line III—III in FIG. 1.

In case the shaft 1 is horizontal as shown in FIGS. 1 through 3, according to the invention, the passage 16 is arranged at an angle φ from about 20° to about 85° to the vertical in the rotation direction of the shaft 1 shown by arrow A (FIGS. 2 and 3). In this embodiment the angle φ is 80°.

To ensure the tightness of an assembly being sealed when rotation of the shaft 1 is reversed, as well as to avoid pressure reduction (compared to atmospheric pressure) inside the sealed assembly, a passage 17 extending in the same radial plane with the passage 16 symmetrically with the passage 16 with respect to a vertical plane drawn through the axis 0—0 of the shaft 1 is arranged in the sleeve 6, as well as in the casing 7 and ring 8.

Pressure reduction inside the sealed assembly may occur owing to an air discharge through the passage 16, together with fluid particles being removed. In such case, the passage 17 equalizes the pressure in the sealed assembly bringing it closer to the atmospheric pressure thus eliminating the intake of the fluid from the plates 2, 3 at high rotary speed of the shaft 1.

According to the invention, at least one through hole 18 (FIGS. 1 and 3) is made in the plate 3 secured to the stationary sleeve 6 adjacent to the passage 16, to extend through flat walls of the plate 3, the axis of the hole being arranged at an acute angle to the direction of rotation of the shaft 1. In this embodiment this angle is 45°. The through hole 18 is designed for removing fluid from the space between the rotary plates 2 and stationary plates 3 (FIG. 1) at low and medium rotary speeds of the shaft 1.

Figure 4:
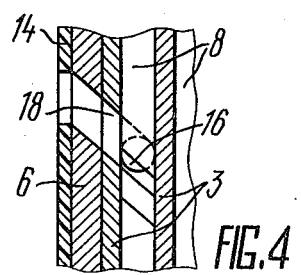
FIG. 4 is a partial section along the line IV—IV in FIG. 1 showing an embodiment wherein a through hole extends also through the stationary sleeve, one of spacer rings and an elastic ring.

To improve the efficiency of operation, the through hole 18 may extend through the sleeve 6 and the ring 8 as shown in FIG. 4.

The labyrinth seal according to the invention functions in the following manner.

When a machine tool is turned on, the shaft 1 starts rotating together with the sleeve 4, ring plates 2 and rings 5. A hydroaerodynamic lift force appearing at the end faces of the plates 2 and 3 acts on the stationary plates 3 and causes them and the stationary sleeve 6 to move relative to the casing 7 in the axial direction until a uniform spacing is ensured between the rotary plates 2 and the stationary plates 3. This is done by overcoming the resistance of the elastic rings 11, 14 and 15.

During rotation of the shaft 1 air and fluid particles penetrating the space between the rotary plates 2 and the stationary plates 3 are driven to rotate at a certain angular speed in the direction of rotation of the plates 2. Centrifugal force which thus appears throws the fluid particles toward the periphery of the plates 2. Therefore, the major mass of the fluid penetrating the space between the rotary plates 2 and the stationary plates 3 is expelled into atmosphere by the left end plate 3 in FIG. 1 and by an end face 19 of the sleeve 4.

However, a part of the fluid may get inside the seal, that is in the space between the next pair of plates 2 and 3 in FIG. 1. In such case, fluid particles are expelled into atmosphere under the action of kinetic and potential energy (dynamic head and gauge pressure of fluid), as well as inertia forces, mainly through the passage 16 and, partly, through the through hole 18 of the stationary plate 3. The passage 17 is designed for equalizing pressure in the sealed assembly to compensate the air intake to the seal, as well as to provide normal operation of the seal upon reversing rotation.

When the rotation is gradually stopped or the rotary speed of the shaft 1 is lowered down, the fraction of fluid removed through the through hole 18 increases since the throughput capacity of the through hole 18 is enhanced with the decrease in the rotary speed of the shaft 1.

Upon complete stoppage of the shaft 1, the hydroaerodynamic lift force at the end faces of the plates 2 and 3 becomes equal to zero, the elastic ring 15 axially shifts the stationary sleeve 6 relative to the casing 7 until the flat walls of the rotary plates 2 engage the stationary plates 3. Fluid particles remaining in the spaces between the plates 2 and 3 are removed from the seal under gravity through the passages 16 and 17 and the through hole 18.

Therefore, the labyrinth seal functions as a contactless hydrodynamic seal during rotation and as a contact seal upon stoppage so as to ensure high tightness both with the stationary shaft and within any desired range of rotary speed of the shaft with minimum heat release.

In some applications this makes it possible to dispense with lubrication of bearing assemblies with an oil mist and to use greasing of bearings. Until now this lubrication method was not possible as widely known labyrinth seals could not ensure sufficient tightness simultaneously with comparatively low heat release, minimum wear, high speed, operability in heavily laden abrasive-filled emulsion medium and rather low manufacturing cost.

The use of greasing of bearings assemblies to replace oil mist lubrication offers important advantages.

First, it is economically more advantageous to use greases as an expensive equipment (pumps, compressors, filters, traps and the like) is required for an oil mist lubrication.

Second, which is more important, the grease cannot contaminate the atmosphere of a shop with oil vapour noxious to the health as differed from the oil mist lubrication where oil vapour penetrate the shop environment from the bearing assembly.

Laboratory and commercial tests of the labyrinth seal according to the invention were a success and they confirmed high sealing efficiency.

Bearing assemblies having this labyrinth seal exhibited high tightness, hence longer service life of bearing supports to give an important economical effect owing to a prolonged period between overhauls of the machine tools, thus lowering the repair and maintenance cost.

What is claimed is:

1. A labyrinth seal for a shaft, comprising: a stationary sleeve coaxial with said shaft; a first set of ring plates rigidly fixed to said shaft; a second set of ring plates fixed to said stationary sleeve; said ring plates of the first set and said ring plates of the second set being arranged in an alternating fashion in parallel with one another and coaxially with said shaft; said sleeve having at least one through passage; said through passage being arranged in a plane intersecting the axis of said shaft and extending at an angle ranging from about $-60°$ to about $+60°$ to a radial plane disposed at a right angle to the axis of said shaft; said through passage terminating at one and thereof in the space between adjacent plates of said respective sets of ring plates to remove fluid from said space under the action of centrifugal force.

2. A labyrinth seal of a shaft according to claim 1, in case the shaft is disposed horizontally, wherein said through passage is disposed at an angle from about 20° to about 85° to the vertical in the direction of rotation of said shaft.

3. A labyrinth seal of a shaft according to claim 1, wherein one of said plates of said second set of ring plates secured to said stationary sleeve adjacent to one end of said through passage has at least one through opening extending through flat walls of said ring plate of said second set of ring plates, the axis of said hole extending at an angle to the direction of rotation of said shaft.

* * * * *